United States Patent [19]

Segeren et al.

[11] 4,018,903
[45] Apr. 19, 1977

[54] PROTEIN FIBERS

[75] Inventors: Antonius Johannes Maria Segeren, Rhoon; Jelles Vincent Boskamp, Vlaardingen, both of Netherlands

[73] Assignee: Thomas J. Lipton, Inc., Englewood Cliffs, N.J.

[22] Filed: Dec. 10, 1975

[21] Appl. No.: 639,281

[30] Foreign Application Priority Data

Dec. 23, 1974 United Kingdom ............ 55553/74

[52] U.S. Cl. .............................. 426/104; 426/516; 426/574; 426/656; 426/802
[51] Int. Cl.² .......................................... A23J 3/00
[58] Field of Search .......... 426/276, 802, 656, 574, 426/657, 652, 516, 93, 104

[56] References Cited

UNITED STATES PATENTS

| | | | |
|---|---|---|---|
| 2,813,794 | 11/1957 | Anson et al. | 426/802 X |
| 2,952,543 | 9/1960 | Szczeshiak et al. | 426/276 |
| 3,210,195 | 10/1965 | Kjelson et al. | 426/104 |
| 3,919,435 | 11/1975 | Feldbrugge et al. | 426/574 |
| 3,953,611 | 4/1976 | Youngquist | 426/276 X |

FOREIGN PATENTS OR APPLICATIONS

| | | | |
|---|---|---|---|
| 7,112,659 | 2/1967 | Japan | 426/276 |
| 7,313,790 | 5/1974 | Netherlands | 426/276 |
| 1,265,661 | 3/1972 | United Kingdom | 426/276 |

Primary Examiner—S. Leon Bashore
Assistant Examiner—Kenneth M. Schor
Attorney, Agent, or Firm—Brumbaugh, Graves, Donohue & Raymond

[57] ABSTRACT

Edible protein fibers with improved characteristics are produced by spinning an aqueous solution of proteins which has been subjected to a heat pre-treatment, into a hot coagulating medium in which the extrudate is completely gelled to obtain fibers of satisfactory texture which can be incorporated in foodstuffs.

13 Claims, 1 Drawing Figure

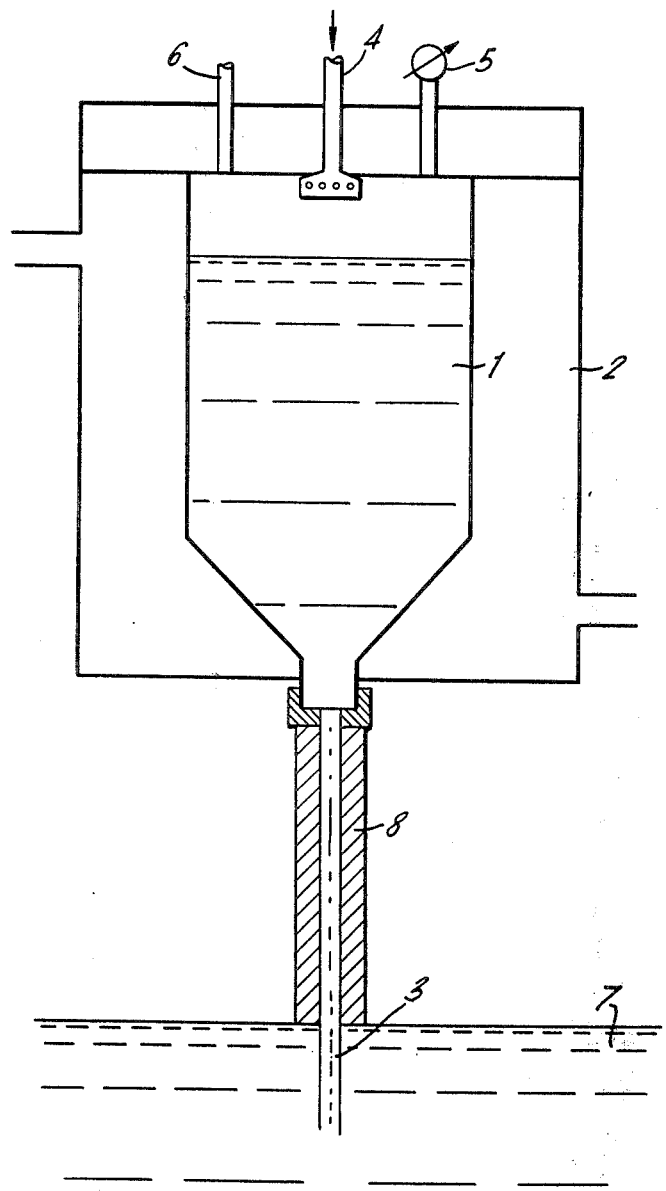

PROTEIN FIBERS

The invention relates to a process for the preparation of protein fibers and to protein fibers with improved characteristics obtained by this process.

The principle of fiber formation resides in the extrusion of a polymer solution or polymer melt through a capillary, after which the liquid filaments are converted into solid fibers. The conditions involved in fiber formation have inter alia been described in detail in A. Ziabicki "Physical Fundamentals of Fibre Spinning, in Man Made Fibres" (ed. H. I. Mark, S. M. Atlas, E. Cernia), Interscience Publishers.

The object of the present invention is to provide fibers, in particular soy protein fibers, with improved characterics, it being envisaged to obtain fibers with improved tensile strength, permanent stretch and crosslinking and having a reduced and uniform diameter.

Applicants contemplate a process for the preparation of fiber material for use in foodstuffs, which when applied in binding agents and when being cooked will remain substantially stable and provide a satisfactory texture.

Surprisingly it has been found that the object contemplated could be attained by heating a spinning solution of protein, before or during the spinning process, to a temperature between 30° C and the temperature at which the protein completely gels and achieving complete gelation of the extrudate in a hot coagulating medium.

The heat pre-treatment, to which the protein solution is subjected before it is brought into contact with the coagulating medium, is referred to throughout the specification as partial pre-gelling.

A possible explanation for the favorable results obtained by the partial pre-gelling step may be that it increases the viscosity of the spinning solution. It is a well-known fact that the viscosity has a great influence on the spinnability of a spinning solution. The viscosity increase effected. by heating the protein solution is believed to be due to unfolding followed by gelation of the protein molecules. A certain degree of orientation of the unfolded molecules before gelation is completed, is obtained during extrusion of the protein material as a result of the shear regime.

It is therefore preferable to carry out the pre-gelling treatment during the extrusion process although pre-gelling effected batchwise in a container also has a beneficial effect.

In case soy protein is used as a starting material, it is believed that during the pre-gelling treatment, one of the main components of the soy protein, namely the 7S fraction, the so-called conglycinine fraction, gels, whereas the 11S fraction, the so-called glycinine fraction, remains substantially undenatured.

When a solution of soy protein is used, it has been found very useful to pre-gel the spinning solution at a temperature between 60° and 85° C, preferably between 74° and 82° C.

These temperature ranges were used both when the spinning solution was pre-gelled batchwise and during the extrusion process.

As has already been indicated the pre-gelling treatment is preferably carried out during the extrusion process. It has been found very convenient to extrude the spinning solution through a capillary tube which is partly immersed in a hot coagulating bath. Another possible method for pregelling the spinning solution during the spinning process is by fitting the capillary tube into a microwave unit.

The dimensions of the capillary, its material and its immersion depth in the coagulating bath, as well as the extrusion velocity of the spinning solution through the capillary may be varied. The most appropriate residence time of the spinning solution in that part of the capillary which is heated e.g. by immersion in the spinning bath at the critical temperature range as indicated above can in each case readily be determined by the expert.

Useful fibers from soy proteins were obtained using a stainless steel capillary having a diameter of 0.1 – 1 mm and a length of about 0.1 m. The temperature of solution present in that part of the capillary tube which is heated can be controlled, for instance by means of a thermocouple and if necessary the extrusion velocity of the spinning solution can be varied to reach the suitble pre-gelling temperature.

A spinning solution suitable for the purpose of the present invention comprises 15 –45%, preferably 25–40% by weight of soy protein and 2–4% by weight of sodium chloride, the pH being in the range 4.8 to 7.0. Such a protein solution can be prepared by a process as described in British Patent No. 1,265,661 on extraction by means of a solution of, for instance, 0.1% sodium sulphite at pH 6.8, precipitation at the isoelectric point and re-dissolution in a solution of sodium chloride. The protein solution is advantageously de-aerated prior to extrusion so as to prevent the formation of weak spots in the fibers.

Useful fibers could be obtained by extrusion of the above solution after pre-gelling has taken place, into a coagulating medium which is preferably a hot coagulating bath, preferably an aqueous bath e.g. distilled water or ordinary tap water at a temperature between 90° and the boiling point of the liquid of the bath, preferably between 96° and 99° C.

Although the pH of the bath is not a critical factor, a pH between 4.8 and 7.0 is preferably used.

The presence of calcium, sodium and phosphate ions in the bath can in some instances be disadvantageous in that it can result in a decrease of the tensile strength of the fibers. In a continuous performance of the process according to the invention the spinning bath should be renewed regularly.

The temperature of the vessel containing the spinning solution and the temperature of that part of the capillary which is not heated approximately correspond to room temperature (20° to 24° C).

The invention will now be illustrated by the following Examples.

EXAMPLE I

1. Preparation of a suitable spinning solution.

The starting material was a soy protein isolate comprising about 48% protein and 52% water (obtained by a process as described in British Pat. No. 1,265,661). The isolate was stored as blocks at −30° C.

A spinning solution having a protein content of 30% by weight was prepared by cutting up these blocks into cubes which were dissolved in water containing 3–4% by weight of NaCl. The mixture of pH 4.8 was vigorously stirred at room temperature and de-aerated. The temperature of the solution as used was 23° C.

2. Manufacture and testing of fibers.

An arrangement as schematically shown in the accompanying Figure was used. The arrangement comprised a storage tank 1 containing the spinning solution. The storage tank was kept at a constant temperature by a thermostat-controlled jacket 2. The spinning solution was forced through a capillary tube 3 by means of compressed air introduced via pipe 4. The tank was further provided with a manometer 5 and an overflow with cock 6. Part of the capillary tube 3 was immersed in the spinning bath 7, the remainder of the capillary tube 3 being surrounded by insulating material 8. The spinning solution described under 1 was extruded in a water bath of pH 6.0 at 99° C through a capillary of stainless steel having a diameter of 0.001 m and a length of 0.1 m. The immersion depth of the capillary was 2 cm. The temperature in that part of the capillary which was immersed in the bath was measured by means of a thermocouple. The extrusion velocity was 0.05 –0.97 m/sec. The temperature of the material at the end of the capillary was 75° ± 2° C. The residence time in that part of the capillary where pre-gelling occurred was suitably about 0.3 sec.

3. Comparision of mechanical properties of the fibers obtained.

a. without pre-gelling;
b. by partially pre-gelling during extrusion.

The conditions mentioned in (2) applied for (a) and (b), except that in the case of (a) the capillary was not immersed in the bath, and was isolated over the whole length. Of the fibers thus obtained measurements were taken with an Instron Universal Testing Machine for fmax. $\lambda m$, $\lambda p$, which are defined as follows: $fmax$ = maximum tensile strength in grams $\lambda m$ = elongated at break $\lambda m$ = maximum length/original length $\lambda p$ = permanent stretch $\lambda p$ = length after stretching/original length By original length is to be understood the length measured after straightening the curls in the fibers.

Nineteen experiments were carried out in extrusion of fibers obtained without pre-gelling during extrusion. The fibers obtained were strongly curled and had a rather irregular diameter. The initial length of the fibers was about 3 cms while the rate of elongation was 1 cm/min./

The result obtained as averages expressed with average standard deviations were:

$\bar{f}max = 4.5$ g $\bar{\lambda} m = 1.8$ $\bar{\lambda} p = 1.2$
$\bar{s} = 1.7$ $\bar{s} = 0.5$ $\bar{s} = 0.1$ diameter: $10^{-4} - 7.10^{-4}$m.

The great deviations were due to the irregular diameter.

For comparative purposes seven experiments were carried out using the partial pre-gelling step according to the present invention.

The fibers thus obtained had the following characteristics:

$\bar{f}max = 11.8$ g $(\bar{s} = 2.0)$
$\bar{\lambda} m = 3.4$ $(\bar{s} = 0.5)$
$\bar{\lambda} p = 1.8$ $(\bar{s} = 0.2)$ diameter = 0.5 mm (the fibers were uniform in diameter).

From the above results it can be concluded that the average fmax of the pre-gelled fibers was about 2.6 times as great as that of the non-pre-gelled fibers; the average $\lambda m$ was about 1.9 times greater in the case of pre-gelled fibers and the average $\lambda p$ about 1.5 times greater.

The appearance of the fibers which had been pre-gelled was much more regular than the appearance of the fibers obtained without application of the pre-gelling step. Similar experiments were carried out with different protein concentrations and the properties of the fibers obtained with and without pre-gelling were compared. The work conditions were similar to those described in Example I.

EXAMPLE II

Spinning of a 20 wt. % soy protein solution which contains 3.1% NaCl.

A capillary with a diameter of 0.5 mm and a length of 10 cm was used.

a. without pre-gelling - fibers could not be obtained.
b. with pre-gelling -immersion depth of the capillary 3 cm.

The fibers obtained were fairly good with a slight variation of their diameter 0.5 mm ± 0.1

$\bar{f}max = 5$ g $\bar{\lambda}m = 1.6$ $\bar{\lambda}p = 1.2$

EXAMPLE III

Spinning of a 25 wt. % soy protein solution which contains 3–4% NaCl. A capillary with a diameter of 0.5 mm and a length of 10 cm was used:

a. when omitting the pre-gelling step fibers were obtained which had an irregular diameter.
$\bar{f}max = 2.7$ g $\bar{\lambda}m = 2.1$ $\bar{\lambda}p = 1.2$
b. with pre-gelling: immersion depth of the capillary was 3 cm.

The fibers obtained had a uniform diameter.

EXAMPLE IV

Spinning of a 40 wt. % soy protein solution which contains 3-4% NaCl.

A capillary with a diameter of 1 mm and a length of 10 cm was used:

a. without pre-gelling fibers were obtained with a diameter of 0.5 mm. $\bar{f}max = 10$ g $\bar{\lambda}m = 3.5$ $\bar{\lambda}p = 2.0$
b. by pre-gelling: immersion depth of the capillary was 2 cm. Fibers were obtained with a diameter of 0.6 mm.
$\bar{f}max = 17$ g $\bar{\lambda}m = 4.4$ $\bar{\lambda}p = 2.3$

EXAMPLE V

Spinning of a 30 wt.% soy protein solution containing 3;14 4 wt. % NaCl, which has been subjected to batchwise pre-gelling.

A 30 wt. % soy protein solution containing 3–4 wt. % NaCl was kept in a container during about 30 minutes at 75° C. The contents of the container were cooled to room temperature, The pre-gelled material was extruded (0.05 m/sec) through a capillary of 1 mm diameter, length 10 cm, which was placed just above the surface of the coagulating bath as described in Example I. The characteristics of the fibers obtained were as follows:

$\bar{f}max = 11$ g $\bar{\lambda}m = 2.95$ $\bar{\lambda}p = 1.6$

EXAMPLE VI

Preparation of a meat-analogue

Fibers obtained following the procedures of the previous examples were tried as a replacement for cooked meat fibers in a reformed meat mix. The fibers were cut into approxiamtely 2 cm lengths and incorporated in a proportion of about 7–8%in the reformed meat mix. After steam heat-setting the "plank" of meat was cut into small cubes (about 1 cm$^3$), put into gravy in polythene bags and frozen to 20° C. The meat cubes were tested by a small panel after the polybag and contents had been reheated for 30 minutes in boiling water. The added fibers were visible in the final product. The comments on texture and flavor were favorable.

We claim:

1. A process for preparing soy protein fibers by spinning an aqueous soy protein solution comprising:
   a subjecting the solution to heat pre-treatment at a temperature between 60° C. and 85° C. for a time sufficient to partially pregel but not completely gel the protein such that the 7S fraction of the soy protein is gelled; and
   b extending the partially pre-gelled soy protein solution into a coagulating fluid medium which is not enough to gel the extrudate completely for a time sufficient to gel the extrudate completely such that the 11S fraction of the soy protein is gelled.

2. The process according to claim 1 wherein heat pre-treatment is carried out during the passage of the soy protein solution through a capillary tube of a spinning device.

3. The process according to claim 1 wherein heat pre-treatment is carried out batchwise before spinning.

4. The process according to claim 1 wherein heat pre-treatment is carried out at a temperature between 74° C. and 82° C.

5. The process according to claim 1 wherein the coagulating medium is water.

6. The process according to claim 5 wherein the temperature of the water is between 90° C. and 99° C.

7. The process according to claim 5 wherein the pH of the water is between 4.8 and 7.0.

8. The process according to claim 1 wherein the concentration of the soy protein solution is between15% and 45% soy protein by weight.

9. the process according to claim 1 wherein the pH of thesoy protein solution is between 4.8 and 7.0.

10. The process according to claim 1 wherein the soy protein solution contains 2% to 4% sodium chloride by weight.

11. Protein fibers prepared according to the process of claim 1.

12. A foodstuff comprising a protein fiber prepared according to the process of claim 1.

13. A process for preparing soy protein fibers by spinning an aqueous soy protein solution comprising:
   a. preparing an aqueous soy protein solution containing 15% to 45% soy protein by weight;
   b. subjecting the solution to heat pre-treatment at a temperature between 60° C. and 85° C. for a time to partially pre-gel but not completely gel the protein such that the 7S fraction of the soy protein is gelled; and
   c. extruding the partially pre-gelled soy protein solution directly into an aqueous coagulating medium having a temperature between 90° C and 99° C. to gel the extrudate completely for a time sufficient to gel the extrudate completely such that the 11S fraction of the soy protein is gelled

* * * * *

UNITED STATES PATENT AND TRADEMARK OFFICE
CERTIFICATE OF CORRECTION

PATENT NO. : 4,018,903
DATED : April 19, 1977
INVENTOR(S) : Segeren et al

It is certified that error appears in the above-identified patent and that said Letters Patent are hereby corrected as shown below:

```
Col. 1, line 17, "characerics" should read --characteristics--;
Col. 2, line 20, "suitble" should read --suitable--;
Col. 3, line 21, "0.97" should read --0.07--;
Col. 3, line 49, "cm/min./" should read --cm/min.--;
Col. 4, line 30, "A capillary witha" should read --A capillary
     with a-- and should start a new paragraph;
Col. 4, line 49, "Fibers" should start a new paragraph;
Col. 4, line 55, "3;14 4 wt. %" should read --3-4 wt.%--;
Col. 4, line 61, "The pre-gelled" should start a new paragraph--;
Col. 5, line 12, "20°C." should read ---20°C.--;
Col. 5, line 26, "extending" should read --extruding--;
Col. 5, line 27, "not" should read --hot--;
Col. 5, line 29, after "completely" insert a comma;
Col. 6, line 13, "the" (first occurrence) should read --The--;
Col. 6, line 14, "thesoy" should read --the soy--;
Col. 6, line 27, after "time" insert --sufficient--;
Col. 6, line 35, after "completely" insert a comma; and
Col. 6, line 36, after "gelled" insert a period.
```

Signed and Sealed this twenty-third Day of August 1977

[SEAL]

Attest:

RUTH C. MASON
Attesting Officer

C. MARSHALL DANN
Commissioner of Patents and Trademarks